June 27, 1933. G. M. CROSSEN 1,915,408
STEAM SEPARATOR
Filed Feb. 6, 1930
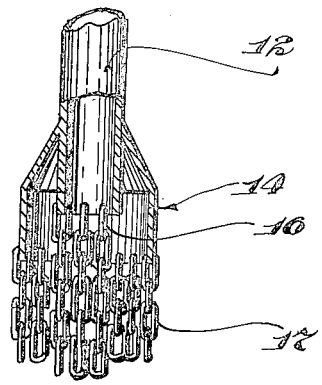
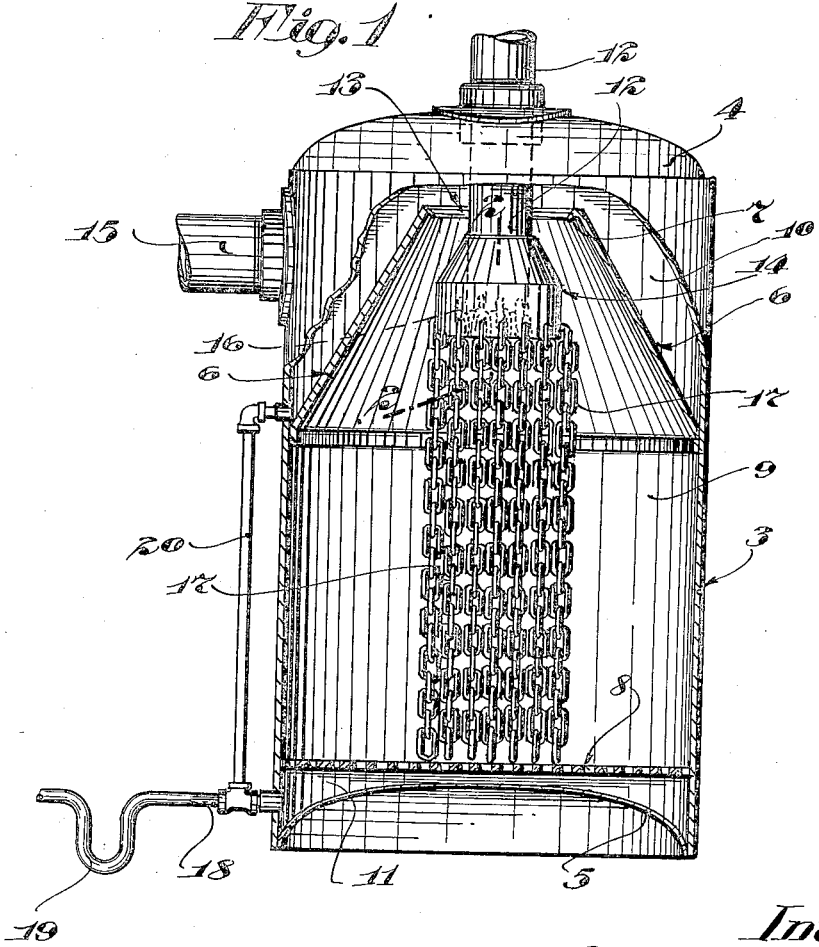
Inventor
George M. Crossen
By his Attorneys Patented June 27, 1933

1,915,408

UNITED STATES PATENT OFFICE

GEORGE M. CROSSEN, OF MINNEAPOLIS, MINNESOTA

STEAM SEPARATOR

Application filed February 6, 1930. Serial No. 426,337.

My present invention relates to a highly efficient, simple and relatively inexpensive device for separating oil, grease and the like from steam, and, generally stated, the invention consists of the novel devices and combinations of devices hereinafter described and defined in the claims.

In the accompanying drawing, which illustrates the invention, like characters indicate like parts throughout the several views.

Referring to the drawing:

Fig. 1 is a view of the device in side elevation, some parts being broken away and some parts being shown in axial section; and Fig. 2 is a fragmentary detail view, some parts being shown in full and some parts being sectioned on the line 2—2 of Fig. 1.

The main body of the separator is in the form of a shell-like cylindrical casing 3 having an upwardly pressed head 4, and an upwardly pressed bottom 5. In the interior of the casing, near the intermediate portion thereof, is a truncated conical baffle partition 6 that is open at its upper end and provided at its edge surrounding said opening with an inwardly and downwardly turned drip flange 7. Relatively close to but spaced from the bottom 5 of the casing is a perforated baffle partition 8. These baffle partitions 6 and 8 divide the interior of the casing into three chambers or compartments, to wit: a steam expansion and cleaning chamber 9 in the intermediate portion of said casing between the baffles 6 and 8, a clean steam chamber 10 above the truncated conical baffle, and a condensation receiving chamber 11 below the perforated baffle partition 8.

Extending axially downward through the top 4 of the casing and projecting axially through the opening in the top of the truncated conical baffle 6 into the expansion chamber 9 is a steam inlet pipe 12. This steam inlet 12 is of much less diameter than the opening in the top of the conical baffle 6 and is spaced from the sides thereof to afford an annular clean steam outlet passage 13 surrounding said inlet tube.

The lower end portion of this steam inlet tube, however, is provided, below the open upper end of the baffle 6 and within the expansion chamber 9, with an enlarged downwardly opening hood-like flange 14. Leading from the clean steam chamber 10 is a clean steam discharge pipe 15. Carried by and depending from the lower end portion of the steam inlet pipe 12 proper is a primary annular series of circumferentially spaced flexible baffles in the form of chains 16 and carried by and depending from the open lower end of the hood-like flange 14 of the inlet pipe 12 is a secondary annular series of circumferentially spaced flexible baffles in the form of link chains 17. These chains 16 and 17 terminates in close relation to the perforated baffle partition 8 and are free at their lower ends so that each thereof is independently free for swinging movements.

Oil laden steam will, when the device is in use, enter the steam cleaning and expansion chamber 9 through the inlet pipe 12 and will be discharged downward therefrom at relatively high velocity and, of course, the steam will then expand and pass outwardly through and between the links of the chains 16 and 17. It will be apparent that because oil is heavier than the steam, part of this oil, which is discharged at relatively high velocity in a downward direction from the inlet pipe 12, will continue its downward travel and strike and go through the perforated baffle partition 8, into the condensation chamber 11 and as the steam expands and passes through and between the chains in series 16 and 17, vaporized oil, grease and the like will condense upon the chains and will run theredown and drip through the baffle partition 8 into the condensation receiving chamber 11.

As the steam expands and after passing through the chains, its velocity will have been very greatly reduced and said steam will whirl around relatively slowly within the expansion chamber 9 in a rather cloud-like form and will reverse its direction of travel and pass upwardly through the annular clean steam opening 13 and into the clean steam chamber 10 and from thence through the clean steam outlet 15 from which point it will usually be returned to the system to be used over again. After the steam has expanded and passed through the chains in series 16 and 17 into the surrounding portion of the chamber 9 most of in fact substantially all of the oil vapor and grease vapor carried by the incoming steam will have become deposited upon the chains in series 16 and 17 and will run theredown and drip into the condensation receiving chamber 11. Due to the slow whirling motion of the steam within the chamber 9 substantially all of said steam will be caused to come into contact with the sides of the casing or deflector 6, before it is passed out of the steam outlet 13 and, therefore, any oil, which is carried by the steam past the chains 16 and 17, will become deposited upon the sides of the chamber 9 and run theredown into the condensation receiving chamber 11. Because the velocity of steam, within the expansion chamber 9, is quite low due to its very great area and because the casing is vertically disposed, the upward movement of steam will have very little tendency to carry condensed oil or steam vapors collected upon the sides of said casing therewith on its upward movement. In case, however, there should, under an abnormally high steam velocity, be any such tendency to carry condensed vapors deposited on the sides of the casing or inside of the baffle partition 6 through the opening, such upward movement of condensed fluid will be retarded or discouraged by the inturn drip flange 7.

The velocity of steam in the chamber 9 will, of course, increase as its diameter is reduced and its upper portion by the truncated conical baffle, but it is important to note that the area of the annular steam outlet 13 is very much greater than that of the inlet pipe 12 and therefore the velocity of steam will be relatively slow even when passed through said opening 13 into the clean steam chamber 10.

Condensation collected in the chamber 11 will be drained therefrom through a drain pipe 18 interposed in which is a seal in the form of a trap 19. This seal will permit condensation to drain off but will prevent a direct blowing through the drain pipe caused by interior pressure. There will, of course, be some condensation of steam in this chamber 10 and this fluid will drain therefrom through a drain pipe 20 to the drain pipe 18.

It is highly important for efficient separation that the flexible baffles 16 and 17 in each series, which are preferably, and, as illustrated, in the form of chains, be quite close together and that the velocity of steam passed thereby be relatively slow so that oil once deposited on the chains will not be carried therefrom.

The chains in my separator are quite close together but due to the length and circumference of these series especially these outer series the total open area therebetween and therethrough is great enough to permit a relatively low velocity of steam in quite great volume. Attention should here be called to the fact that because the chains are loose at their lower ends and free for swinging movements they will be caused to swing slightly under operating conditions by the usual pulsation of incoming steam and this swinging movement will aid oil deposited or condensed upon the chains to flow theredown more rapidly and drip into the bottom compartment 11 and, of course, the speed of downward flow of oil on these chains will also be increased by the downward velocity of steam within the portion of the chamber surrounded by said chains.

Under normal operating conditions the chains will hang in a substantially vertical position but in case there is a sudden impulse of steam injected into the separator, the volume and velocity of which is above normal, these chains will swing outward thus permitting the increased volume of steam to be passed through and between the chains without increasing its velocity. In other words the velocity of steam passed between the chains or flexible baffles will be substantially constant even under varying volume. In this manner deposits of oil upon the chains will not be picked up by steam, which is injected into the separator at abnormal velocity.

The perforated baffle partition 8 prevents the whirling steam from agitating and picking up oil once condensed and deposited into the condensation chamber 11.

What I claim is:

1. A steam separator comprising a casing, a downwardly opening steam inlet in said casing, a primary annular series of circumferentially spaced flexible oil collecting baffles surrounding and depending from said steam inlet, a secondary annular series of circumferentially spaced flexible oil collecting baffles, surrounding and spaced from said primary baffles, and a clean steam outlet near the upper portion of said casing.

2. The structure defined in claim 1 in which said flexible oil collecting baffles are in the form of chains.

3. The structure defined in claim 1 in which said flexible oil collecting baffles are in the form of chains, and which chains are free for swinging movements.

4. The structure defined in claim 1, in which the baffles in each series of baffles are free for independent swinging movements.

5. A steam separator comprising a vertically disposed cylindrical casing, a partition-forming baffle in said casing having a substantially axial opening therein, said partition-forming baffle dividing the casing into two chambers, to wit: a steam expansion chamber below said partition and a clean steam chamber above said partition, a steam inlet pipe extended into said casing through the upper portion thereof and projecting downward axially through the opening in said partition-forming baffle into the expansion chamber, said inlet pipe being of less diameter than said partition opening to afford an annular clean steam passage surrounding said pipe, an annular series of circumferentially spaced flexible baffles depending from the open end portion of said pipe, and a clean steam outlet in said casing from said clean steam chamber.

6. The structure defined in claim 5 in further combination with a perforated baffle in said casing between the lower ends of said flexible baffles and the bottom of said chamber thus forming a condensation chamber below said expansion chamber.

7. The structure defined in claim 5 in further combination with a perforated baffle in said casing between the lower ends of said flexible baffles and the bottom of said chamber thus forming a condensation chamber below said expansion chamber, and said flexible baffles are in the form of chains and which terminate in close relation to said perforated baffle.

8. The structure defined in claim 5 in further combination with a secondary annular series of flexible baffles surrounding and spaced from the first noted series.

9. A steam separator comprising a vertically disposed cylindrical casing, a partition-forming baffle in said casing having a substantially axial opening therein, said partition-forming baffle dividing the casing into two chambers, to wit: a steam expansion chamber below said partition and a clean steam chamber above said partition, a steam inlet pipe extended into said casing through the upper portion thereof and projecting downward axially through the opening in said partition-forming baffle into the expansion chamber, said inlet pipe being of less diameter than said partition opening to afford an annular clean steam passage surrounding said pipe, an annular series of circumferentially spaced baffles suspended from the discharge end of said inlet pipe, surrounding said inlet and being free for swinging movements, and a clean steam outlet in said casing leading from said clean steam chamber.

10. A steam separator including a vertically disposed cylindrical casing, a partition-forming baffle in said casing having a substantially axial opening therein, said partition-forming baffle dividing the casing into two chambers, to wit: a steam expansion chamber below said partition, and a clean steam chamber above said partition, a steam inlet pipe extending into said casing through the upper portion thereof and projecting downwardly through the opening in said partition-forming baffle and into the expansion chamber and being of less diameter than said partition opening to afford an annular clean steam passage surrounding said pipe, oil-collecting means depending from and surrounding the discharge end of said inlet pipe, and a clean steam outlet in said casing leading from said clean steam chamber.

11. In a steam separator, a steam expansion chamber, a steam inlet opening downwardly into said expansion chamber, a steam outlet leading from the expansion chamber, and an annular series of circumferentially spaced oil collecting baffles suspended from and surrounding the discharge end portion of the steam inlet and terminating in such close relation to the bottom of the expansion chamber that substantially all of the steam discharged into the expansion chamber through said inlet will be passed radially outward through or between the said circumferentially spaced oil collecting baffles.

12. In a steam separator, a casing having a bottom, a perforated baffle located in spaced relation to the bottom of the casing, a steam inlet opening downwardly into said casing, a clean steam outlet leading from the casing, and an annular series of circumferentially spaced oil collecting baffles suspended directly from and surrounding the discharge end of the steam inlet and terminating in such close relation to the said perforated baffle that substantially all of the steam discharged into the casing through the inlet will be passed therebetween or through the perforated baffle before it is discharged from the casing through the clean steam outlet.

In testimony whereof I affix my signature.

GEORGE M. CROSSEN.